(12) United States Patent
Sun et al.

(10) Patent No.: US 10,209,559 B2
(45) Date of Patent: Feb. 19, 2019

(54) DISMANTLING DEVICE FOR LIQUID CRYSTAL DISPLAY WITH DRIVING COMPONENT INCLUDED

(71) Applicants: BOE Technology Group Co., Ltd., Beijing (CN); HEFEI BOE Optoelectronics Technology Co., Ltd., Hefei (CN)

(72) Inventors: Youhao Sun, Beijing (CN); Gang Wang, Beijing (CN); Yunxiao Zhang, Beijing (CN); Bin Yang, Beijing (CN); Xianglong Meng, Beijing (CN); Jun Zhou, Beijing (CN); Wenjuan Zhang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 151 days.

(21) Appl. No.: 15/126,878

(22) PCT Filed: Nov. 19, 2015

(86) PCT No.: PCT/CN2015/095055
§ 371 (c)(1),
(2) Date: Sep. 16, 2016

(87) PCT Pub. No.: WO2016/197548
PCT Pub. Date: Dec. 15, 2016

(65) Prior Publication Data
US 2018/0173055 A1    Jun. 21, 2018

(30) Foreign Application Priority Data

Jun. 12, 2015   (CN) .......................... 2015 1 0334922

(51) Int. Cl.
*B26D 5/10*     (2006.01)
*B26D 7/01*     (2006.01)
(Continued)

(52) U.S. Cl.
CPC ....... *G02F 1/133602* (2013.01); *B26D 1/547* (2013.01); *B26D 5/10* (2013.01);
(Continued)

(58) Field of Classification Search
CPC .. G09G 3/34; G09G 3/36; G06F 2203/04103; G02F 1/13306; G02F 1/133602;
(Continued)

(56) References Cited

U.S. PATENT DOCUMENTS 6,227,276 B1 *   5/2001   Kim .................... B29C 63/0013
                                                                156/247
9,931,742 B2 *   4/2018   Wang ...................... B25B 27/00
(Continued)

FOREIGN PATENT DOCUMENTS

CN      103676241 A      3/2014
CN      203616545 U      5/2014
(Continued)

OTHER PUBLICATIONS

Mar. 10, 2016—(WO) Written Opinion of ISA—Intl App PCT/CN2015/095055 with English Translation.
(Continued)

*Primary Examiner* — Keith L Crawley
(74) *Attorney, Agent, or Firm* — Banner & Witcoff, Ltd.

(57) ABSTRACT

A device for dismantling a liquid crystal display includes a carrier platform, a dismantling bracket, a dividing piece and a driving component; the carrier platform includes a carrying surface for supporting the liquid crystal display to be dismantled thereon, and the liquid crystal display to be dismantled includes a display panel and a backlight unit
(Continued)

bonded to each other; the dividing piece is located above the carrier platform and mounted onto the dismantling bracket; the dividing piece is capable of being driven by the driving component so as to move in a first direction and into a slit between the display panel and the backlight unit; and the first direction intersects with an extending direction of the dividing piece. The dismantling device for liquid crystal display can solve the problem that the display panel and the backlight unit are difficult to be dismantled.

14 Claims, 4 Drawing Sheets

(51) Int. Cl.
　　*B26D 7/18*　　　(2006.01)
　　*G02F 1/13*　　　(2006.01)
　　*G09G 3/36*　　　(2006.01)
　　*B26D 1/547*　　(2006.01)
　　*B32B 38/10*　　(2006.01)
　　*B32B 43/00*　　(2006.01)
　　*G02F 1/1333*　　(2006.01)
　　*G02F 1/1335*　　(2006.01)

(52) U.S. Cl.
　　CPC ........... *B26D 7/018* (2013.01); *B26D 7/1863* (2013.01); *B32B 38/10* (2013.01); *B32B 43/003* (2013.01); *G02F 1/1303* (2013.01); *G02F 1/133308* (2013.01); *G09G 3/36* (2013.01); *G02F 2203/68* (2013.01); *Y10T 156/1967* (2015.01)

(58) Field of Classification Search
　　CPC ........... G02F 1/133308; B32B 38/0004; B32B 38/10; B32B 43/003; B32B 43/006; Y10T 156/19; Y10T 156/195; Y10T 156/1967; Y10T 156/1972; B26D 1/547; B26D 1/5475; B26D 1/56; B26D 3/28; B26D 5/08; B26D 5/10; B26D 7/018; B26D 7/1863; B26D 7/01; B26D 7/0616

See application file for complete search history.

(56) References Cited

U.S. PATENT DOCUMENTS

| | | | | |
|---|---|---|---|---|
| 2008/0245483 A1* | 10/2008 | Toyoshima | ........... | B32B 43/006 156/763 |
| 2010/0199818 A1* | 8/2010 | Lee | ........ | B26D 1/547 83/16 |
| 2011/0174445 A1* | 7/2011 | Ciliberti | ............ | H01L 21/67132 156/752 |
| 2014/0150981 A1* | 6/2014 | Itou | ...................... | B32B 38/1858 156/714 |
| 2014/0196854 A1* | 7/2014 | Lee | ........ | B32B 43/006 156/752 |
| 2014/0338828 A1* | 11/2014 | Lee | ........ | B32B 43/006 156/247 |
| 2014/0352892 A1* | 12/2014 | Lee | ........ | B32B 43/006 156/714 |
| 2015/0083340 A1* | 3/2015 | Price | ..................... | B32B 43/006 156/701 |
| 2016/0095268 A1* | 3/2016 | Wang | .................... | G02F 1/1303 29/592.1 |
| 2016/0377894 A1* | 12/2016 | Park | ..................... | G02F 1/1303 445/61 |

FOREIGN PATENT DOCUMENTS

| | | |
|---|---|---|
| CN | 203616557 U | 5/2014 |
| CN | 104385342 A | 3/2015 |
| CN | 104932125 A | 9/2015 |

OTHER PUBLICATIONS

Mar. 10, 2016—International Search Report—Intl App PCT/CN2015/095055 with English Translation.
May 17, 2017—(CN) First Office Action Appn 201510334922.0 with English Tran.

* cited by examiner

DISMANTLING DEVICE FOR LIQUID CRYSTAL DISPLAY WITH DRIVING COMPONENT INCLUDED

The application is a U.S. National Phase Entry of International Application No. PCT/CN2015/095055 filed on Nov. 19, 2015, designating the United States of America and claiming priority to Chinese Patent Application No. 201510334922.0 filed on Jun. 12, 2015. The present application claims priority to and the benefit of the above-identified applications and the above-identified applications are incorporated by reference herein in their entirety.

TECHNICAL FIELD

At least one embodiment of the present disclosure relates to a dismantling device for liquid crystal display.

BACKGROUND

A thin film transistor liquid crystal display (TFT-LCD) comprises a display panel formed by cell-assembling the array substrate and the color filter substrate. The display panel comprises a display side and a non-display side opposite to the display side. The TFT-LCD further comprises a backlight unit (BLU) provided at the non-display side of the display panel for providing a light source.

If a quality problem is spotted in some part of the backlight unit in the detection process of the TFT-LCD, for example, a single LED does not operate to light, and then it is required to dismantle the display panel and the backlight unit apart from each other so as to replace the LED that does not light.

Since the display panel and the backlight unit are commonly secured to each other by a double-sided adhesive provided therebetween, it is very difficult to dismantle the display panel and the backlight unit apart, thus unfavorable to the replacement of the components in question.

SUMMARY

At least one embodiment of the present disclosure provides a dismantling device for liquid crystal display capable of solving the problem that the display panel and the backlight unit are difficult to be dismantled apart.

In one aspect, at least one embodiment of the disclosure provides a device for dismantling a liquid crystal display, comprising a carrier platform, a dismantling bracket, a dividing piece and a driving component; the carrier platform comprises a carrying surface for supporting the liquid crystal display to be dismantled thereon, and the liquid crystal display to be dismantled comprises a display panel and a backlight unit bonded to each other; the dividing piece is located above the carrier platform and mounted onto the dismantling bracket; the dividing piece is capable of being driven by the driving component so as to move in a first direction and into a slit between the display panel and the backlight unit; and the first direction intersects with an extending direction of the dividing piece.

For example, in the dismantling device for liquid crystal display provided by one embodiment of the present disclosure, the dismantling bracket comprises a first support pole and a second support pole that are provided vertically, and comprises a third support pole provided horizontally; the first support pole and the second support pole are provided at both sides of the carrier platform respectively, one end of the dividing piece is secured onto the first support pole while the other end is secured onto the second support pole, the third support pole is provided below the carrier platform; the first support pole and the second support pole are connected to the third support pole respectively.

For example, in the dismantling device for liquid crystal display provided by one embodiment of the present disclosure, the first support pole and the second support pole are telescopic rods.

For example, the dismantling device for liquid crystal display provided by one embodiment of the present disclosure further comprises a position adjusting member, the third support pole is fitted onto the position adjusting member and is configured to move in the first direction under an action of the position adjusting member.

For example, the driving component is connected to the position adjusting member, and the position adjusting member comprises a ball screw and at least one guide post extending in a direction parallel with an extending direction of the ball screw; the third support pole is provided with a first mounting hole and at least one second mounting hole; the first mounting hole is provided with a ball nut therein, which is configured to cooperate with the ball screw; the guide post passes through the second mounting hole; an axis of the first mounting hole is parallel with that of the second mounting hole; and the driving component comprises a rotary handle connected with the ball screw.

For example, in the dismantling device for liquid crystal display provided by one embodiment of the present disclosure, a number of the second mounting holes is equal to a number of the guide posts.

For example, in the dismantling device for liquid crystal display provided by one embodiment of the present disclosure, the driving component is connected with the dismantling bracket, and the position adjusting member comprises a guide rail.

For example, in the dismantling device for liquid crystal display provided by one embodiment of the present disclosure, the third support pole is provided on the guide rail.

For example, the dismantling device for liquid crystal display provided by one embodiment of the present disclosure further comprises an absorbing component located above the display panel or the backlight unit, the absorbing component is used to adsorb the display panel or the backlight unit, so that the display panel or the backlight unit can form an angle of 10° to 35° with respect to the carrying surface of the carrier platform.

For example, in the dismantling device for liquid crystal display provided by one embodiment of the present disclosure, the dividing piece is a wire, a diameter of which is from 0.3 mm to 0.5 mm.

For example, in the dismantling device for liquid crystal display provided by one embodiment of the present disclosure, the wire comprises a fishing line, a molybdenum wire or titanium wire.

For example, in the dismantling device for liquid crystal display provided by one embodiment of the present disclosure, the dividing piece is a sheet, a thickness of which is from 0.3 mm to 0.5 mm.

For example, in the dismantling device for liquid crystal display provided by one embodiment of the present disclosure, the sheet comprises a metal sheet or resin sheet.

For example, in the dismantling device for liquid crystal display provided by one embodiment of the present disclosure, the carrying surface is provided with a groove therein; a dimension of the groove matches with a dimension of the display panel or the backlight unit in a horizontal direction, and a dimension of the groove in a vertical direction is less than or equal to a thickness of the display panel or the backlight unit.

For example, in the dismantling device for liquid crystal display provided by one embodiment of the present disclosure, the dismantling bracket is provided to drive the dividing piece to move in the first direction under driving of the driving component.

In another aspect, at least one embodiment of the present disclosure provides a device for dismantling the liquid crystal display, comprising a carrier platform, a absorbing component, a transfer component, a dismantling bracket, a dividing piece and a driving component; the carrier platform comprises a carrying surface for supporting the liquid crystal display to be dismantled thereon, and the liquid crystal display to be dismantled comprises a display panel and a backlight unit bonded to each other; the dividing piece is located above the carrier platform and mounted onto the dismantling bracket, and the dismantling bracket is secured to the carrier platform; the driving component is connected with the transfer component, and the absorbing component is fitted onto the transfer component in such a way that, under driving of the driving component, the absorbing component moves till above the display panel or the backlight unit and is absorbed to a surface of the display panel or the backlight unit, so that the display panel or the backlight unit can form an angle of 10° to 35° with respect to the carrying surface of the carrier platform, then drive the liquid crystal display to move in a first direction so that the dividing piece enter a slit between the display panel and the backlight unit; the first direction intersects with an extending direction of the dividing piece.

For example, in the dismantling device for liquid crystal display provided by one embodiment of the present disclosure, the dismantling bracket comprises a first support pole and a second support pole that are provided vertically; the first support pole and the second support pole are provided at both sides of the carrier platform respectively, and are each secured onto the carrier platform, one end of the dividing piece is secured onto the first support pole while its other end is secured onto the second support pole.

For example, in the dismantling device for liquid crystal display provided by one embodiment of the present disclosure, the first support pole and the second support pole are telescopic rods.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 2a is a structural schematic view of the dismantling bracket and the position adjusting member as shown in FIG. 1a;

FIG. 3 is a structural schematic view of the ball screw nut pair as shown in FIG. 2a;

FIG. 4 is a structural schematic view of another position adjusting member as shown in FIG. 1a;

REFERENCE NUMERALS

10—display panel; 11—backlight unit; 20—carrier platform (object platform); 201—groove; 30—dismantling bracket; 301—first support pole; 302—second support pole; 303—third support pole; 3031—first mounting hole; 3032—second mounting hole; 31—dividing piece; 40—position adjusting member; 401—ball screw; 410—ball nut; 411—balls; 402—guide post; 50—driving component; 60—absorbing component; 61—transfer component; 610—rotary wheel; 611—belt; 101—liquid crystal display to be dismantled; 70—rotary tray; 421—guide rail.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1A:
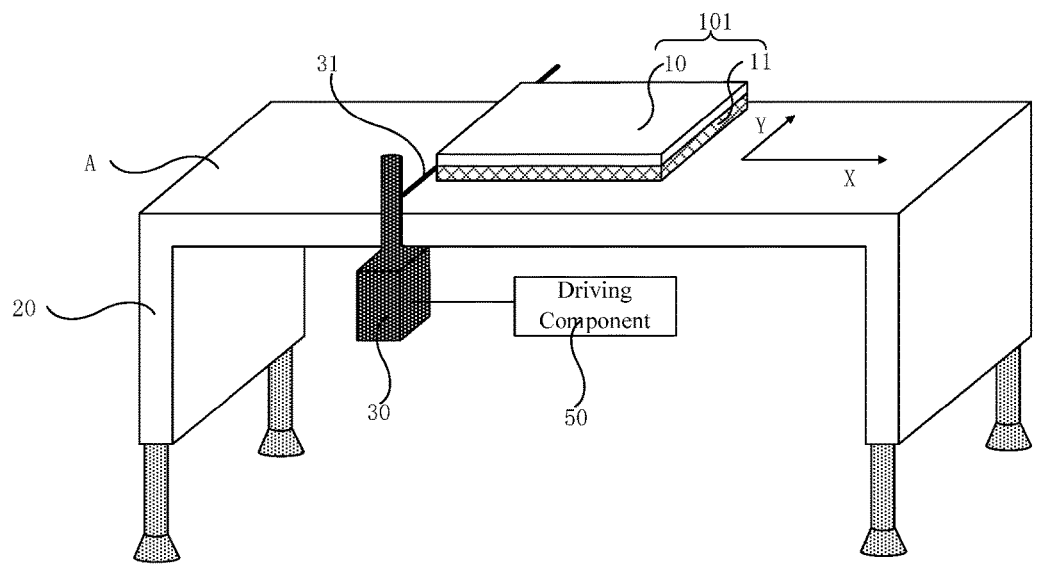
FIG. 1a is a structural schematic view of a dismantling device for liquid crystal display provided by an embodiment of the present disclosure.

At least one embodiment of the present disclosure provides a dismantling device for liquid crystal display, as shown in FIG. 1a; the dismantling device may comprise a carrier platform 20, a dismantling bracket 30, a dividing piece 31 and a driving component 50.

The carrier platform 20 comprises a carrying surface A that is configured for supporting the liquid crystal display 101 to be dismantled thereon, and the liquid crystal display 101 to be dismantled comprises a display panel 10 and a backlight unit 11 bonded to each other;

The dividing piece 31 is provided above the carrier platform 20 and is mounted on the dismantling bracket 30, the dividing piece 31 moves in a first direction X and into the slit between the display panel 10 and the backlight unit 11 under the driving of the driving component 50. The first direction X intersects with the extending direction of the dividing piece 31.

It should be noted, first, the display panel 10 and the backlight unit 11 bonded to each other refers to that a double-sided adhesive tape is adhered onto the frame of the backlight unit 11 and bonds the display panel 10 and the backlight unit 11 together with the adhesive on its both sides.

Second, in the dismantling process, as shown in FIG. 1a, it is required to place the liquid crystal display device onto the carrying surface A horizontally, so that the surface of the display panel 10 or the backlight unit 11, which has the largest area, contact the carrying surface A.

Figure 1B:
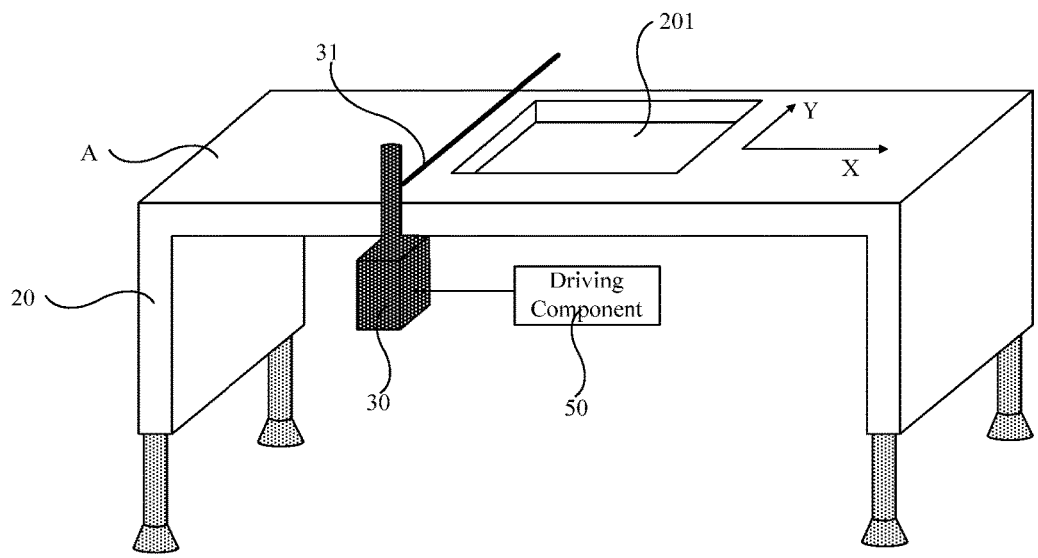
FIG. 1b is a structural schematic view of the dismantling device for liquid crystal display shown in FIG. 1a with the carrier platform thereof provided with a groove.

Furthermore, to secure the position of the liquid crystal display device on the carrier platform 20 in the dismantling process to avoid the occurrence of positional shift which would otherwise influence the dismantling process, a groove 201 can be provided at the carrying surface A as shown in FIG. 1b. The dimension of the groove 201 matches with the dimension of the display panel 10 or the backlight unit 11 in the horizontal direction, thereby ensuring that the liquid crystal display device can be entirely placed into the groove 201 when it is placed onto the carrier surface of the carrier platform 20. Furthermore, the dimension of the groove 201 in the vertical direction is less than or equal to the thickness of the display panel 10 or the backlight unit 11, thus it can be ensured that the binding face of the display panel 10 with the backlight unit 11 is located beyond the carrying surface A so as to prevent the binding face from being hidden in the groove, which would otherwise cause the dividing piece 31 unable to run into the gap between the display panel 10 and the backlight unit 11 during it proceeds.

Third, the extending direction Y of the dividing piece 31 refers to the direction from one end of the dividing piece 31, which is secured onto the first support pole 301, to the other end thereof, which is secured onto the second support pole 302. The first direction X means the movement direction of the dismantling bracket 30 under the driving of the driving component 50, along which the dividing piece 31 can enter the slit between the display panel 10 and the backlight unit 11 so as to divide apart the double-sided adhesive therebetween, to achieve the purpose of dismantling the display panel and the backlight unit. For example, the first direction X is perpendicular to the extending direction Y, however, the arrangement is not limited thereto.

For example, when the first direction X is in parallel with the central axis of the display panel 10 or the backlight unit 11, the extending direction Y can form an angle of 90° with the first direction X; in this way, given a certain dimension of the liquid crystal display, the dividing piece 31 has a minimal dimension in its extending direction Y, thereby saving material inputs.

For example, the dismantling bracket is provided to drive the dividing piece to move in the first direction X under the driving of the driving component.

At least one embodiment of the present disclosure provides a dismantling device for liquid crystal display comprising a carrier platform, a dismantling bracket, a dividing piece and a driving component. The carrier platform comprises a carrying surface for supporting the liquid crystal display to be dismantled thereon, and the liquid crystal display to be dismantled comprises a display panel and a backlight unit bonded to each other; the dividing piece is located above the carrier platform and mounted on the dismantling bracket, in the way, the dividing piece moves in the first direction intersecting with the extending direction of the dividing piece, under the driving of the driving component, the dividing piece can enter the slit between the display panel and the backlight unit thus dividing the double-sided adhesive between the display panel and the backlight unit, to reach the purpose of dismantling the display panel and the backlight unit.

A detailed description will be made with respect to the structure of the above dismantling device for liquid crystal display through specific embodiments in the following.

First Embodiment

Figure 2A:
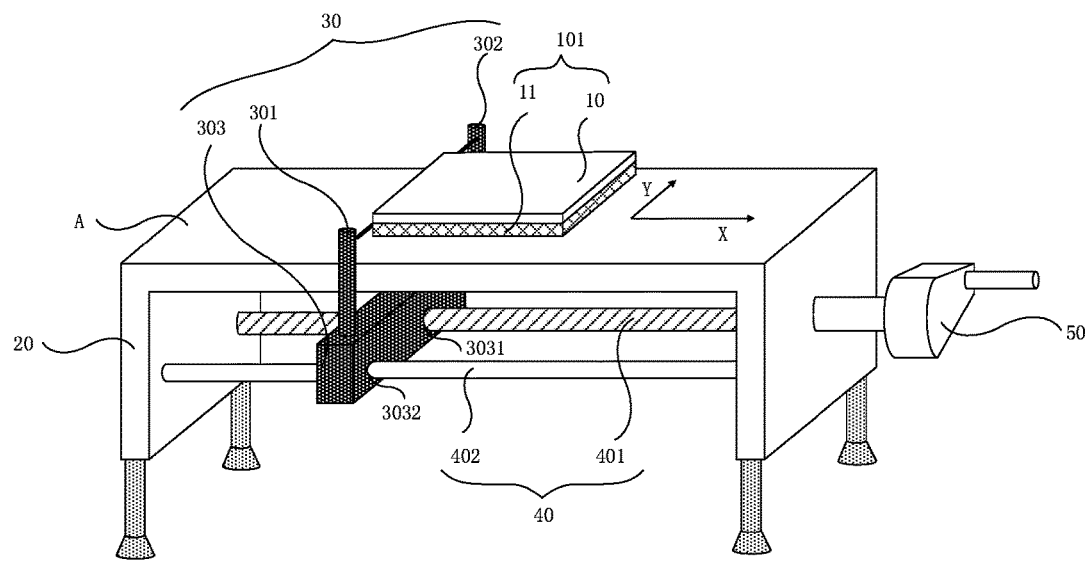

The present embodiment provides a dismantling device for liquid crystal display, as shown in FIG. 2a, the dismantling device for liquid crystal display may comprise a carrier platform 20, a dismantling bracket 30, a dividing piece 31 and a driving component 50.

The carrier platform 20 comprises a carrying surface A for supporting the liquid crystal display 101 to be dismantled thereon, and the liquid crystal display 101 to be dismantled comprises a display panel 10 and a backlight unit 11 bonded to each other;

The dividing piece 31 is located above the carrier platform 20 and is mounted on the dismantling bracket 30, the dividing piece 31 moves in a first direction X and into the slit between the display panel 10 and the backlight unit 11 under the driving of the driving component 50. The first direction X intersects with the extending direction of the dividing piece 31.

For example, in one example of this embodiment, the dismantling bracket 30 is provided to drive the dividing piece 31 to move in the first direction X under the driving of the driving component 50.

For example, in one example of this embodiment, the dismantling bracket 30 may comprise a first support pole 301 and a second support pole 302 that are arranged vertically, and may comprise a third support pole 303 that is arranged horizontally. The first support pole 301 and the second support pole 302 is located at both sides of the carrier platform 20 respectively, one end of the dividing piece 31 is secured to the first support pole, while its other end is secured to the second support pole 302. The third support pole 303 is located below the carrier platform; the first support pole 301 and the second support pole 302 are connected to the third support pole 303 respectively. In this way, the dividing piece 31 can be secured with the first support pole 301 and the second support pole 302, thus the third support pole 303 is provided below the carrier platform 20, saving the space occupied by the dismantling device, so that the dismantling device has an overall compact structure, and the staffs can place several liquid crystal displays to be dismantled side by side on the carrying surface A according to actual requirement as well as the physical length of the carrier platform 20. Thus the situation where the third support pole 303 is provided above the carrier platform 20 is avoided, which situation may otherwise cause spatial wastage.

Furthermore, for liquid crystal display devices of different dimensions and different specifications, the bonding faces between the display panels 10 and the backlight units 11 also have distinct distances from the carrying surface A. Therefore in order to enable the dismantling bracket 30 to be used for dismantling the liquid crystal display devices of different dimensions and specifications, it is necessary to regulate the distance between the dividing piece 31 and the carrying surface A so that the dividing piece 31 can move into the slit between the display panel 10 and the backlight unit 11 in the process of moving along the first direction X. In such cases, the first support pole 301 and the second support pole 302 each can be constituted by a telescopic rod, it is thus possible to regulate the distance between the dividing piece 31 and the carrying surface A by regulating the height of the telescopic rod.

Figure 2B:
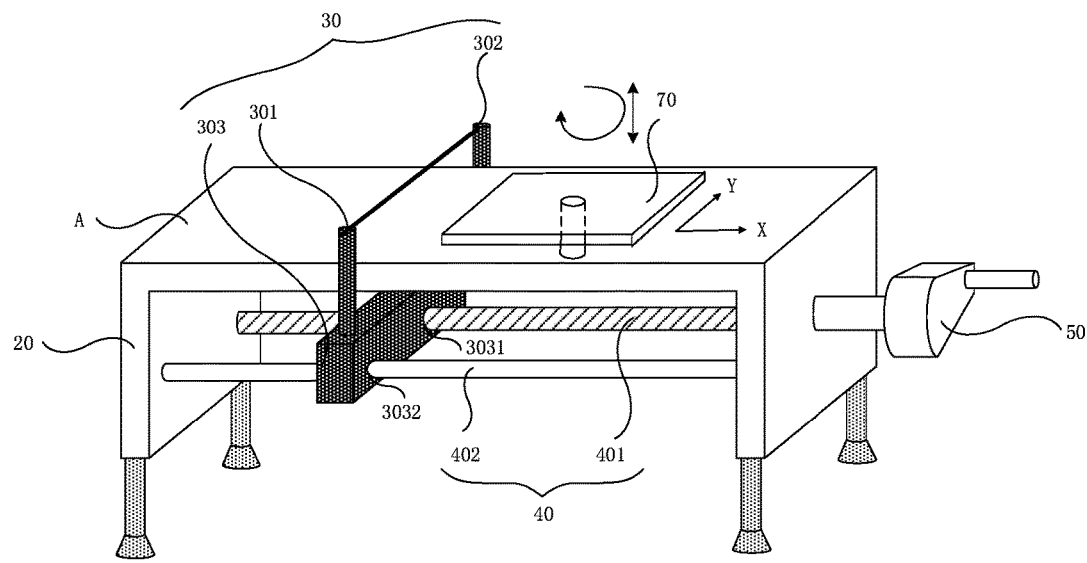
FIG. 2b is a structural schematic view of a dismantling device for liquid crystal display provided with a rotating platform.

Of course, in a case where the first support pole 301 or the second support pole 302 is not constituted by a telescopic rod, a rotary tray 70, the height of which is adjustable, can be provided on the carrying surface A so that the dividing piece 31 can divide liquid crystal displays of different dimensions, as shown in FIG. 2b, then the display panel 10 or the backlight unit 11 of a liquid crystal display is placed horizontally onto the rotary tray 70, by regulating the height of the rotary tray 70, the dismantling bracket 30 can move into the slit between the display panel 10 and the backlight unit 11 in its moving process along the first direction X. The rotary tray 70 can rotate clockwisely or anti-clockwisely and is adjustable in height, that is, the distance between the rotary tray 70 and the carrying surface is adjustable.

For example, in one example of this embodiment, the dividing piece 31 of the dismantling bracket 30 can be a wire, for example, the diameter thereof can be 0.3 mm to 0.5 mm. If the diameter of the wire is less than 0.3 mm, because the wire is too thin, such a wire is likely to suffer from breakage under the action of an external force in the dismantling process, thus increasing the probability of replacing the dividing piece 31. If the wire has a diameter greater than 0.5 mm, while it can effectively reduce the probability of wire breakage, the diameter of the wire is too large and the gap between the display panel 10 and the backlight unit 11 is too small, so that the resistance against the passage of the wire is increased, thus depressing the dismantling efficiency. For example, in order to improve the dismantling efficiency and effect, the wire may employ a fishing line, a molybdenum wire or a titanium wire of higher tensile strength and flexibility.

For example, in one example of this embodiment, the dividing piece 31 of the dismantling bracket 30 may be a thin sheet, the thickness of which may be 0.3 mm to 0.5 mm, when the thickness of the sheet is less than 0.3 mm, the sheet is too thin, thus the wire is likely to suffer from breakage under the action of an external force in the dismantling process, which increases the probability of replacing the dividing piece 31. If the sheet has a thickness greater than 0.5 mm, while it is possible to effectively reduce the probability of sheet breakage, the thickness of the sheet is too large and the gap between the display panel 10 and the backlight unit 11 is too small, so that the resistance against the passage of the sheet is increased, thus depressing the dismantling efficiency. For example, the sheet may comprise a metal sheet or a resin sheet.

For example, in one example of this embodiment, the dismantling device for liquid crystal display may further comprise a position adjusting member 40. In order to render a dismantling device to have an overall compact structure, the position adjusting member 40 can be fitted below the carrier platform 20. For example, the third support pole 303 is fitted on the position adjusting member 40, and the third support pole 303 can be moved in the first direction X under the action of the position adjusting member 40.

For example, in one example of this embodiment, when the driving component 50 is coupled with the dismantling bracket 30 to enable the dividing piece 31 to move in the first direction X under the driving of the driving component 50, the position adjusting member 40 may comprise, as shown in FIG. 2a, a ball screw 401 and at least one guide post 402 parallel with the extending direction of the ball screw 401.

Figure 3:
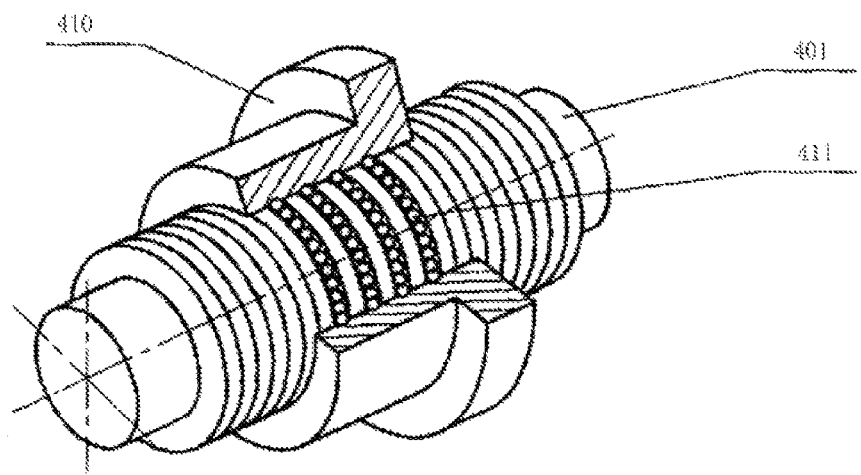

For example, in one example of this embodiment, the third support pole 303 is provided with a first mounting hole 3031 and at least one second mounting hole 3032. The first mounting hole 3031 is provided with a ball nut 410 therein cooperating with the ball screw 401 (as shown in FIG. 3). For example, the at least one guide post 402 is fitted with the at least one second mounting hole 3032 in a one-to-one manner (the number of the second mounting holes is equal to that of the guide posts), and is secured at a side of the carrier platform 20. For example, to facilitate machining, the axle centers of the first mounting hole 3031 and the second mounting hole 3032 may be parallel with each other.

For example, in one example of this embodiment, the driving component 50 may comprise a rotary handle coupled with the ball screw 401. In this way, when the operator rotates the rotary handle, the ball screw 401 is rotated, then with the interaction among the ball nut 410, the ball 411 and the ball screw 401 and also with the guiding of the guide post 402, the rotation movement of the ball screw 401 is converted into a linear motion of the ball nut 410 in the first direction X. Due to the fact that the ball nut 410 can be fitted inside the first mounting hole 3031 in the situation of interference fit, when the ball nut 410 moves, the ball nut 410 can bring the entire dismantling bracket 30 to move in the first direction X under the guiding of the guide post 402, thus the dividing piece 31 can move into the slit between the display panel 10 and the backlight unit 11 so as to dismantle the display panel 10 and the backlight unit 11.

Of course, the connection of the driving component 50 with the position adjusting member 40 is illustrated in consideration of the ball screw pair merely by way of example. In order to realize the connection of the driving component 50 (for example, the rotary handle) with the position adjusting member 40, and to convert the rotation movement of the driving component 50 into the linear motion of the dismantling bracket 30, the position adjusting member 40 can also comprise a gear and a rack that mate with each other. For example, the rotary handle used as the driving component 50 is fitted onto the gear, and the third support pole 303 of the dismantling bracket 30 is fitted onto the rack, when the rotary handle is rotated, the rack can drive the entire dismantling bracket 30 to make a linear motion in the first direction X, so that the dividing piece 31 can run into the slit between the display panel 10 and the backlight unit 11 so as to dismantle the display panel 10 and the backlight unit 11 apart from each other. Other arrangements, in which the dividing piece 31 makes a linear motion in the first direction X when the driving component 50 is coupled with the position adjusting member 40, will not be detailed herein.

Second Embodiment

Figure 4:
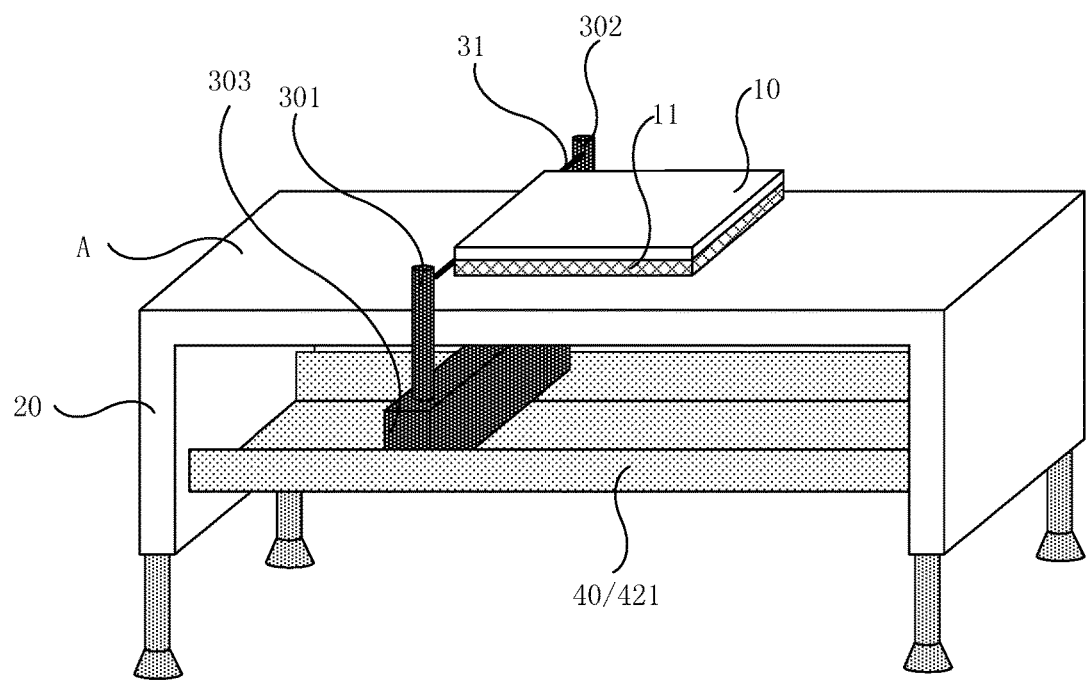

The carrier platform 20, the dismantling bracket 30 and the dividing piece 31 in this embodiment are all identical to those in the first embodiment. The difference lies in that this embodiment will be illustrated taking the case where the driving component 50 (not shown in FIG. 4) is coupled with the dismantling bracket 30 as an example. In such a case, the position adjusting member 40 can be a guide rail 421 provided in the first direction X as shown in FIG. 4. The third support pole 303 is provided on the guide rail 421. The guide rail 421 causes the third support pole 303 provided thereon to move in the first direction X.

For example, in one example of this embodiment, the driving component 50 can be provided outside of the dismantling bracket 30 and coupled with the third support pole 303; alternatively, the driving component 50 can be provided inside of the third support pole 303. For example, the driving component 50 can be an electrical motor of a compact type. In this way, the third support pole 303 within the guide rail can make a linear motion along the guide rail under the driving of the electrical motor. Because the guide rail is arranged in the first direction X, by the driving of the electrical motor the entire dismantling bracket 30 can make a linear motion in the first direction X, so that the dividing piece 31 can move into the slit between the display panel 10 and the display panel 10 to dismantle the display panel 10 and the backlight unit 11.

Third Embodiment

The carrier platform 20, the dismantling bracket 30, the dividing piece 31 and the position adjusting member 40 as well as the driving component 50 in this embodiment may refer to those counterparts the embodiment one and the embodiment two.

The difference is in that, in this embodiment, the display panel 10 and the backlight unit 11 can have an angle β therebetween.

For example, in a normal production process, to realize the adhesion of the display panel 10 with the backlight unit 11, only if one of the four sides of the plastic frame of the backlight unit 11 is adhered with double-sided adhesive, the display panel 10 and the backlight unit 11 can be secured to each other. In this way, to enable the dividing piece to move into the slit between the display panel 10 and the backlight unit 11 much more easier, as shown in FIG. 4, the angle β can be formed at the locations between the display panel 10 and the backlight unit 11 where no double-sided adhesive is provided between the display panel 10 and the backlight unit 11.

Figure 5:
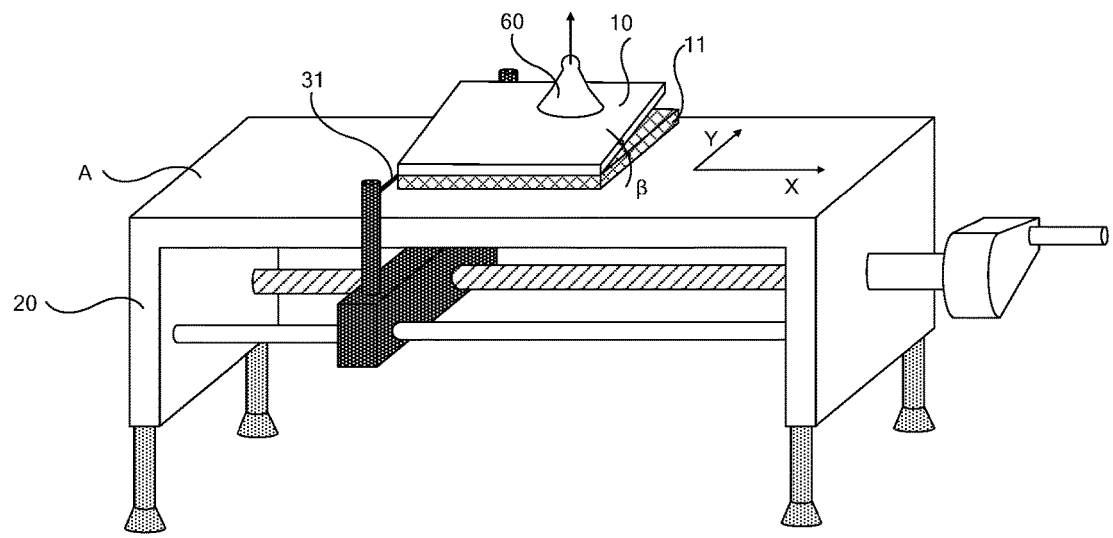
FIG. 5 is a structural schematic view of the dismantling device for liquid crystal display as shown in FIG. 2a with an added absorbing component.

For example, to achieve the above object, the dismantling device may further comprise an absorbing component 60, as shown in FIG. 5. The absorbing component 60 is located above the display panel 10 or the backlight unit 11. For example, to form an angle β even better, the absorbing component 60 may correspond to a location on the bonding face between the display panel 10 and the backlight unit 11 where no double-sided adhesive is provided.

For example, the extending direction of the double-sided adhesive provided at the bonding face between the display panel 10 and the backlight unit 11 can be made parallel with the first direction X, however, the arrangement is not limited thereto. For example, the extending direction of the double-sided adhesive provided at the bonding face between the display panel 10 and the backlight unit 11 can be made orthogonal to the first direction X, however, it is not limited thereto.

For example, the display panel 10 or the backlight unit 11 can be adsorbed by the absorbing component 60, so that the angle formed between the display panel 10 or the backlight unit 11 and the carrying surface A of the carrier platform 20 is from 10° to 35°. When the angle β is less than 10°, because the slit between the display panel 10 and the backlight unit 11 has no noticeable variation, the dividing piece 31 is not easy to move into the slit between the display panel 10 and the backlight unit 11. When the angle β is greater than 35°, the deformation of the display panel 10 or the backlight unit 11 may be enlarged, thus influencing the product quality.

For example, in one example of this embodiment, the absorbing component 60 may be a vacuum adsorbing ball, and in the adsorption process, the air within the adsorbing ball can be forced out manually by the operator, so that the sucker of the adsorbing ball can be adsorbed onto the surface of the display panel 10 or the backlight unit 11. Alternatively, the air inside of the absorbing component can be sucked out through a machinery automatic control, in such a way that the sucker of the absorbing component 60 can be adsorbed onto the surface of the display panel 10 or the backlight unit 11.

Fourth Embodiment

All of the above embodiments are illustrated taking the case where the dividing piece 31 moves in the first direction X in the dismantling process while the liquid crystal display device is kept in a standstill state, as an example. This embodiment provides another type of dismantling device for liquid crystal display, in which, in the dismantling process, the dividing piece 31 (or the dismantling bracket 30) is kept at its position without movement, but the liquid crystal display device moves in the first direction X, and the dismantling device has the structure as described in the following.

Figure 6:
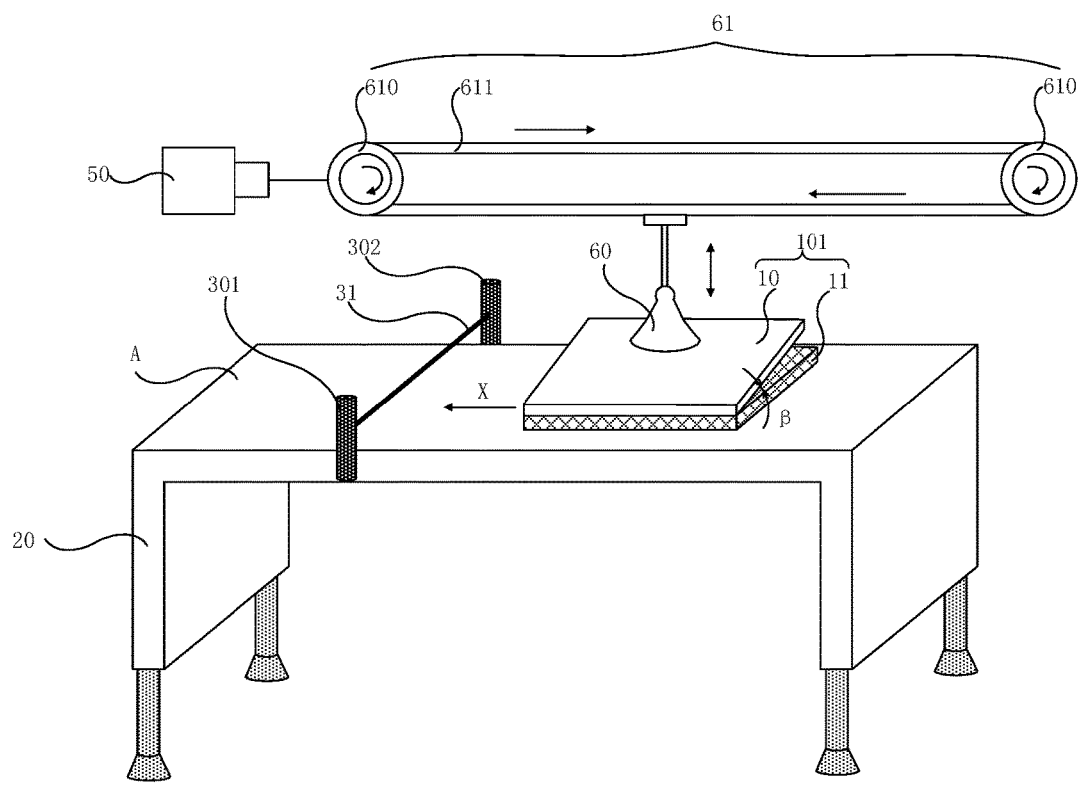
FIG. 6 is a structural schematic view of another dismantling device for liquid crystal display provided by another embodiment of the present disclosure.

The dismantling device for liquid crystal display provided by this embodiment is as shown in FIG. 6, and comprises a carrier platform 20, an absorbing component 60, a transfer component 61, a dismantling bracket 30, a dividing piece 31 and a driving component 50.

The carrier platform 20 comprises a carrying surface A for supporting the liquid crystal display 101 to be dismantled thereon, and the liquid crystal display 101 to be dismantled comprises a display panel 10 and a backlight unit 1 bonded to each other.

The dividing piece 31 is located above the carrier platform 20 and mounted on the dismantling bracket 30, and the dismantling bracket 30 is secured to the carrier platform 20.

The driving component 50 is coupled with the transfer component 61, and the absorbing component 60 is fitted on the transfer component 61, so as to move to the above of the display panel 10 or the backlight unit 11 under the driving of the driving component 50 and to be adsorbed to the surface of the display panel 10 or the backlight unit 11, so that the display panel 10 or the backlight unit 11 forms an angle of 10° to 35° with the carrying surface A of the carrier platform 20. Then the liquid crystal display is drove to move in the first direction X to make the dividing piece 31 run into the slit between the display panel 10 and the backlight unit 11. The first direction X intersects with the extending direction Y of the dividing piece 31. For example, the first direction X is perpendicular to the extending direction Y of the dividing piece 31, however, the arrangement is not limited thereto.

When the angle β is less than 10°, because the slit between the display panel 10 and the backlight unit 11 undergoes no noticeable variation, the dividing piece 31 is not easy to move into the slit between the display panel 10 and the backlight unit 11. When the angle β is greater than 35°, the deformation of the display panel 10 or the backlight unit 11 will be enlarged, thus influencing the product quality.

For example, in one example of this embodiment, as shown in FIG. 6, the dismantling bracket 30 may comprise a first support pole 301 and a second support pole 302 that are arranged vertically. The first support pole 301 and the second support pole 302 are located at both sides of the carrier platform 20 respectively and are secured to the carrier platform 20, the dividing piece 31 is located above the carrying surface 20, one end of the dividing piece 31 is secured to the first support pole 301 while its other end is secured to the second support pole 302.

For example, in one example of this embodiment, as shown in FIG. 6, the transfer component 61 may comprise two rotary wheels 610 and a belt 611, the driving component 50 can be a driving motor connected with a rotary wheel 610 so as to drive the rotary wheel 610 to rotate and thus to rotate another rotary wheel 610 and the belt 611. Furthermore, the transfer component 61 can also move up and down in the vertical direction, in this way, when the absorbing component 60 reaches the above of the display panel 10 or the backlight unit 11, the transfer component 61 can move downward, the contact area of the absorbing component 60 with the surface of the display panel 10 or the backlight unit 11 is enlarged, thus facilitating the absorption of the absorbing component 60 onto the surface of the display panel 10 or the backlight unit 11. When the display panel 10 or the backlight unit 11 is adsorbed up by the absorbing component 60, the liquid crystal display device can be transported to the dismantling bracket 30 along with the movement of the transfer component 61, and when liquid crystal display device further moves, the dividing piece 31 can run into the slit between the display panel 10 and the backlight unit 11 and achieve dismantling of the display panel 10 and the backlight unit 11. Moreover, the structure of the absorbing component 60 may refer to the third embodiment.

To be specified, the dividing piece 31 in this embodiment may employ the wire or sheet as described in the first embodiment. Also, the first support pole 301 and the second support pole 302 in this embodiment may also be a telescopic rod, the effect thereof is identical to the aforesaid embodiments, and therefore redundant description is omitted here.

It can be seen, in comparison with the above embodiments, the arrangement provided in the first embodiment has a lower cost than the embodiments in which the driving component 50 is an electrical motor, because the driving component 50 can be a rotary handle, and during the entire dismantling process, the liquid crystal display device is not moved, thus avoiding undesirable influence upon its quality due to the movement of the liquid crystal display device by itself. Thus, the arrangement provided by the first embodiment one is high in performance price ratio.

At least one embodiment of the present disclosure provides a dismantling device for liquid crystal display, the liquid crystal display comprises a display panel and a backlight unit bonded to each other, and the dismantling device for liquid crystal display comprises a carrier platform, a dismantling bracket, a dividing piece and a driving component. The dividing piece is located above the carrier platform and mounted on the dismantling bracket, in this way, the dividing piece moves in the first direction intersecting with the extending direction of the dividing piece under the driving of the driving component, the dividing piece can enter the slit between the display panel and the backlight unit thus dividing the double-sided adhesive between the display panel and the backlight unit, to reach the purpose of dismantling the display panel and the backlight unit.

The following points should be noted:

(1) Unless defined otherwise, the technical terms or scientific terminology being used herein should take the meaning usually understood by those ordinary skilled in this art of present disclosure. The "first", "second" and similar terms used herein do not intend to mean any sequence, quantity or importance, but only to distinguish different components.

(2) The drawings of the embodiments of present disclosure merely involves structures associated with the embodiment of present disclosure, other structures may refer to common designs.

(3) Absent confliction, the embodiments of present disclosure and the features thereof can be combined to obtain a new embodiment.

The above are only specific embodiments of the present disclosure, the protective scope of the present disclosure is not limited thereto, it is conceivable for the skilled in this art to obtain variation or alternation within the technical scope disclosed in by the present disclosure, all of which should fall into the protective scope of the present disclosure. Therefore, the protective scope of the present disclosure should be in accord with the protective scope of the claims.

The present application claims the priority of the Chinese patent application No. 201510334922.0 filed on Jun. 12, 2015, the entirety of which is incorporated herein by reference as a part of the present application.

What is claimed is:

1. A device for dismantling a liquid crystal display, comprising a carrier platform, a dismantling bracket, a dividing piece and a driving component, wherein the carrier platform comprises a carrying surface for supporting the liquid crystal display to be dismantled thereon, and the liquid crystal display to be dismantled comprises a display panel and a backlight unit bonded to each other;

the dividing piece is located above the carrier platform and mounted onto the dismantling bracket;

the dividing piece is capable of being driven by the driving component so as to move in a first direction and into a slit between the display panel and the backlight unit;

the first direction intersects with an extending direction of the dividing piece; and the dismantling device further comprising an absorbing component located above the display panel or the backlight unit, wherein the absorbing component is used to absorb the display panel or the backlight unit, so that the display panel or the backlight unit can form an angle of 10° to 35° with respect to the carrying surface of the carrier platform, wherein the dismantling bracket comprises a first support pole and a second support pole that are provided vertically, and comprises a third support pole provided horizontally; the first support pole and the second support pole are provided at both sides of the carrier platform respectively, one end of the dividing piece is secured onto the first support pole while the other end is secured onto the second support pole, the third support pole is provided below the carrier platform; and the first support pole and the second support pole are connected to the third support pole respectively;

the dismantling device for liquid crystal display further comprises a ball screw and at least one guide post extending in a direction parallel with an extending direction of the ball screw;

the third support pole is provided with a first mounting hole and at least one second mounting hole; the ball screw passes through the first mounting hole;

the first mounting hole is provided with a ball nut therein, which is configured to cooperate with the ball screw;

the guide post passes through the second mounting hole;

an axis of the first mounting hole is parallel with that of the second mounting hole;

the driving component comprises a rotary handle connected with the ball screw;

the third support pole, the ball screw and the guide post are provided at a side, which is away from the dividing piece, of the carrier platform; and the dividing piece, the carrier platform and the ball screw are sequentially provided in a direction perpendicular to the carrier platform.

2. The dismantling device for liquid crystal display according to claim 1, wherein the first support pole and the second support pole are telescopic rods; and an end, which is not connected to the third support pole, of the first support pole, the carrier platform, and an end, which is connected to the third support pole, of the first support pole are sequentially provided in the direction perpendicular to the carrier platform.

3. The dismantling device for liquid crystal display according to claim 1, wherein the third support pole is configured to move in the first direction under an action of the ball screw and the guide post.

4. The dismantling device for liquid crystal display according to claim 1, wherein a number of the second mounting holes is equal to a number of the guide posts.

5. The dismantling device for liquid crystal display according to claim 1, wherein the dividing piece is a wire, a diameter of which is from 0.3 mm to 0.5 mm; and an extension direction of the wire is perpendicular to the extending direction of the ball screw.

6. The dismantling device for liquid crystal display according to claim 5, wherein the wire comprises a fishing line, a molybdenum wire or titanium wire.

7. The dismantling device for liquid crystal display according to claim 1, wherein the dividing piece is a sheet, a thickness of which is from 0.3 mm to 0.5 mm.

8. The dismantling device for liquid crystal display according to claim 7, wherein the sheet comprises a metal sheet or resin sheet.

9. The dismantling device for liquid crystal display according to claim 1, wherein the carrying surface is provided with a groove therein;
the groove is provided at a side, which is away from the ball screw and closer to the dividing piece, of the carrier platform; and
a dimension of the groove matches with a dimension of the display panel or the backlight unit in a horizontal direction, and a dimension of the groove in a vertical direction is less than or equal to a thickness of the display panel or the backlight unit.

10. The dismantling device for liquid crystal display according to claim 1, wherein the dismantling bracket is provided to drive the dividing piece to move in the first direction under driving of the driving component.

11. A device for dismantling a liquid crystal display, comprising a carrier platform, an absorbing component, a transfer component, a dismantling bracket, a dividing piece and a driving component, wherein
the carrier platform comprises a carrying surface for supporting the liquid crystal display to be dismantled thereon, and the liquid crystal display to be dismantled comprises a display panel and a backlight unit bonded to each other;
the dividing piece is located above the carrier platform and mounted onto the dismantling bracket, and the dismantling bracket is secured to the carrier platform;
the driving component is connected with the transfer component, and the absorbing component is fitted onto the transfer component in such a way that, under driving of the driving component, the absorbing component moves until above the display panel or the backlight unit and is absorbed to a surface of the display panel or the backlight unit, so that the display panel is configured to form an angle of 10° to 35° with respect to the backlight unit, then drive the liquid crystal display to move in a first direction so that the dividing piece enters a slit between the display panel and the backlight unit; and
the first direction intersects with an extending direction of the dividing piece.

12. The dismantling device for liquid crystal display according to claim 11, wherein the dismantling bracket comprises a first support pole and a second support pole that are provided vertically; the first support pole and the second support pole are provided at both sides of the carrier platform respectively, and are each secured onto the carrier platform, one end of the dividing piece is secured onto the first support pole while its other end is secured onto the second support pole.

13. The dismantling device for liquid crystal display according to claim 12, wherein the first support pole and the second support pole are telescopic rods.

14. The dismantling device for liquid crystal display according to claim 1, further comprising a height-adjustable rotary tray on the carrying surface, wherein the carrying surface is configured to support the liquid crystal display to be dismantled through the height-adjustable rotary tray.

\* \* \* \* \*